US010628737B2

(12) United States Patent
Cohen et al.

(10) Patent No.: US 10,628,737 B2
(45) Date of Patent: Apr. 21, 2020

(54) IDENTIFYING CONSTRUCTIVE SUB-DIALOGUES

(71) Applicant: Oath Inc., New York, NY (US)

(72) Inventors: Courtney Napoles Cohen, Balitmore, MD (US); Aasish Pappu, New York, NY (US); Joel Tetreault, New York, NY (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/406,565

(22) Filed: Jan. 13, 2017

(65) Prior Publication Data

US 2018/0203846 A1 Jul. 19, 2018

(51) Int. Cl.
*G06N 3/08* (2006.01)
*H04L 29/08* (2006.01)
*G06F 17/24* (2006.01)
*G06F 17/27* (2006.01)
*G06N 3/04* (2006.01)
*G06N 7/00* (2006.01)

(52) U.S. Cl.
CPC ............ *G06N 3/08* (2013.01); *G06F 17/241* (2013.01); *G06F 17/279* (2013.01); *G06N 3/0445* (2013.01); *G06N 7/005* (2013.01); *H04L 67/02* (2013.01); *H04L 67/10* (2013.01); *H04L 67/2833* (2013.01)

(58) Field of Classification Search
None
See application file for complete search history.

(56) References Cited

U.S. PATENT DOCUMENTS

| 7,594,189 B1* | 9/2009 | Walker | G06F 16/9535 715/811 |
| 7,930,302 B2* | 4/2011 | Bandaru | G06F 16/951 707/737 |
| 7,962,555 B2* | 6/2011 | Sastry | G06F 16/986 709/206 |
| 8,386,335 B1* | 2/2013 | Cohen | G06Q 10/10 705/26.64 |

(Continued)

OTHER PUBLICATIONS

FitzGerald, Nicholas, et al. "Exploiting conversational features to detect high-quality blog comments." Canadian Conference on Artificial Intelligence. Springer, Berlin, Heidelberg, 2011. (Year: 2011).*

*Primary Examiner* — Jonathan C Kim
(74) *Attorney, Agent, or Firm* — Cooper Legal Group, LLC

(57) ABSTRACT

Software on a website hosting an online forum extracts a plurality of sub-dialogues from each thread in a corpus from the online forum. The software obtains one or more sub-dialogue annotations associated with each sub-dialogue. The sub-dialogue annotations include an annotation as to whether the sub-dialogue is constructive. The software extracts a plurality of features from each sub-dialogue uses them and the sub-dialogue annotations associated with the sub-dialogue to train a classifier that determines whether a particular sub-dialogue is constructive. Then the software obtains a new sub-dialogue from a thread currently displayed in the online forum and extracts the plurality of features from the new sub-dialogue. The software inputs the features extracted from the new sub-dialogue into the classifier and obtains a determination as to whether the new sub-dialogue is constructive.

20 Claims, 8 Drawing Sheets

(56) References Cited

U.S. PATENT DOCUMENTS

| | | | |
|---|---|---|---|
| 9,104,750 B1* | 8/2015 | Dhamdhere | G06F 16/3322 |
| 9,386,107 B1* | 7/2016 | Browning | G06Q 50/01 |
| 9,542,669 B1* | 1/2017 | Browning | G06Q 10/109 |
| 9,552,399 B1* | 1/2017 | Browning | G06Q 50/01 |
| 9,560,152 B1* | 1/2017 | Jamdar | H04L 67/22 |
| 9,665,551 B2* | 5/2017 | Zhuang | G06F 16/285 |
| 9,674,128 B1* | 6/2017 | Browning | G06Q 50/01 |
| 9,680,782 B2* | 6/2017 | Barshow | H04L 51/16 |
| 9,779,094 B2* | 10/2017 | Kumar | G06F 16/954 |
| 9,866,516 B1* | 1/2018 | Fisher | H04M 3/5191 |
| 9,923,860 B2* | 3/2018 | Krishnaswamy | H04L 51/32 |
| 2010/0030798 A1* | 2/2010 | Kumar | G06F 16/954 |
| | | | 707/737 |
| 2011/0202512 A1* | 8/2011 | Pantanelli | G06F 17/2785 |
| | | | 707/706 |
| 2013/0103623 A1* | 4/2013 | Burstein | G06N 20/00 |
| | | | 706/12 |
| 2013/0179766 A1* | 7/2013 | Madnani | G06F 17/241 |
| | | | 715/230 |
| 2013/0282362 A1* | 10/2013 | Taylor | G06F 17/274 |
| | | | 704/9 |
| 2014/0093845 A1* | 4/2014 | Kim | G06F 17/273 |
| | | | 434/162 |
| 2014/0344261 A1* | 11/2014 | Navta | G06F 16/951 |
| | | | 707/723 |
| 2014/0351257 A1* | 11/2014 | Zuzik | H04L 67/10 |
| | | | 707/740 |
| 2015/0032829 A1* | 1/2015 | Barshow | H04L 51/16 |
| | | | 709/206 |
| 2015/0179168 A1* | 6/2015 | Hakkani-Tur | G10L 15/22 |
| | | | 704/257 |
| 2015/0186497 A1* | 7/2015 | Patton | G06F 16/285 |
| | | | 707/740 |
| 2017/0034107 A1* | 2/2017 | Krishnaswamy | H04L 51/32 |
| 2017/0084269 A1* | 3/2017 | Shi | G10L 15/16 |
| 2017/0206271 A1* | 7/2017 | Jain | G06F 16/338 |
| 2017/0228361 A1* | 8/2017 | Zhang | G06Q 10/10 |
| 2017/0300862 A1* | 10/2017 | Bhadouria | G06N 20/00 |
| 2018/0032898 A1* | 2/2018 | Wu | G06Q 50/01 |
| 2018/0046614 A1* | 2/2018 | Ushio | G06F 17/2755 |

* cited by examiner

Pipeline for predicting the constructiveness of a sub-dialogue.

| Sub-dialogue annotations | |
|---|---|
| Dimension | Labels |
| Type* | Argumentative<br>Flamewar<br>Snarky/humorous<br>Positive/respectful<br>Off-topic/digression<br>Personal stories |
| Agreement | Agreement throughout<br>Initial disagreement converging to agreement<br>Continual disagreement throughout<br>Initial agreement that turns into disagreement |
| Constructiveness | Constructive<br>Not constructive |
| Comment annotations | |
| Dimension | Labels |
| Sentiment | Positive<br>Negative<br>Neutral<br>Mixed |
| Tone* | Informative<br>Controversial<br>Sarcastic<br>Funny<br>Sympathetic<br>Mean |
| Agreement* | Agreement with other commenter<br>Disagreement with other commenter<br>Adjunct/personal opinion |
| Topic* | Off-topic with conversation<br>Off-topic with article<br>Personal story |
| Audience | Reply to specific commenter<br>Broadcast/general |
| Persuasiveness | Persuasive<br>Not persuasive |

This annotation scheme was used for labeling sub-dialogues and comments. Each dimension additionally offered a "not-applicable" label. Dimensions indicated by * allow multiple labels.

Figure 5

| Features | P | R | F1 |
|---|---|---|---|
| Baseline | 0.44 | 0.52 | 0.48 |
| *Agreement* | 0.36 | 0.19 | 0.25 |
| Case | 0.77 | 0.40 | 0.53 |
| Comment length | 0.71 | 0.52 | 0.60 |
| *Comment thumbs* | 0.46 | 0.29 | 0.35 |
| Constituency | 0.52 | 0.52 | 0.52 |
| Dependency | 0.54 | 0.50 | 0.52 |
| Entity | 0.74 | 0.40 | 0.52 |
| *Idea* | 0.63 | 0.29 | 0.39 |
| Formality | 0.75 | 0.43 | 0.55 |
| *Influence* | 0.47 | 0.21 | 0.30 |
| *Lexical* | 0.62 | 0.31 | 0.41 |
| Lexicon | 0.64 | 0.43 | 0.51 |
| N-gram | 0.69 | 0.68 | 0.66 |
| *Politeness* | 0.69 | 0.26 | 0.38 |
| POS | 0.61 | 0.55 | 0.57 |
| Readability | 0.60 | 0.43 | 0.50 |
| *Similarity* | 0.55 | 0.40 | 0.47 |
| *Subjectivity* | 0.59 | 0.38 | 0.46 |
| *Thread length* | 0.62 | 0.19 | 0.29 |
| *Thread thumbs* | 0.78 | 0.17 | 0.27 |
| *Temporal* | 0.56 | 0.12 | 0.20 |
| *Tweet POS* | 0.51 | 0.43 | 0.47 |
| W2V | 0.69 | 0.60 | 0.64 |

Precision, recall, and F-measure of predicting constructiveness using each feature group alone on a held-out development set of 100 sub-dialogues. Feature groups that have a lower F-score than a random baseline are italicized.

Figure 7

IDENTIFYING CONSTRUCTIVE SUB-DIALOGUES

BACKGROUND

Online forums such as reddit and comment sections for online articles allow users to converse with one another through the posting of comments in comment threads.

Constructive dialogues in such forums and comment sections tend to increase user engagement with the service hosting the forum or publishing the article, whereas dialogues that are not constructive tend to have the opposite effect.

Determining whether a dialogue is constructive or not is usually not necessarily a difficult task for a literate human. However, it has proven to be a difficult task to automate, at least in part because of the "comment-centric" approaches adopted by most researchers.

Consequently "dialogue-centric" approaches to the automation of this task remain an active area of research and experimentation.

SUMMARY

In an example embodiment, a processor-executed method is described. According to the method, software on a website hosting an online forum extracts a plurality of sub-dialogues from each thread in a corpus from the online forum. Each sub-dialogue includes a plurality of comments and each thread includes at least one sub-dialogue. The software obtains one or more sub-dialogue annotations associated with each sub-dialogue. The one or more sub-dialogue annotations include an annotation as to whether the sub-dialogue is constructive. The software extracts a plurality of features from each sub-dialogue and uses them and the sub-dialogue annotations associated with the sub-dialogue to train a classifier that determines whether a particular sub-dialogue is constructive. Then the software obtains a new sub-dialogue from a thread currently displayed in the online forum and extracts the plurality of features from the new sub-dialogue. The software inputs the features extracted from the new sub-dialogue into the classifier and obtains a determination as to whether the new sub-dialogue is constructive. Then the software uses the determination to re-locate the new sub-dialogue in the thread.

In another example embodiment, an apparatus is described, namely, computer-readable media which persistently store a program for a website hosting an online forum. The program extracts a plurality of sub-dialogues from each thread in a corpus from the online forum. Each sub-dialogue includes a plurality of comments and each thread includes at least one sub-dialogue. The program obtains one or more sub-dialogue annotations associated with each sub-dialogue. The one or more sub-dialogue annotations include an annotation as to whether the sub-dialogue is constructive. The program extracts a plurality of features from each sub-dialogue and uses them and the sub-dialogue annotations associated with the sub-dialogue to train a classifier that determines whether a particular sub-dialogue is constructive. Then the program obtains a new sub-dialogue from a thread currently displayed in the online forum and extracts the plurality of features from the new sub-dialogue. The program inputs the features extracted from the new sub-dialogue into the classifier and obtains a determination as to whether the new sub-dialogue is constructive. Then the program uses the determination to re-locate the new sub-dialogue in the thread.

Another example embodiment also involves a processor-executed method. According to the method, a processor-executed method is described. According to the method, software on a website hosting an online forum extracts a plurality of sub-dialogues from each thread in a corpus from the online forum. Each sub-dialogue includes a plurality of comments and each thread includes at least one sub-dialogue. The software obtains one or more sub-dialogue annotations associated with each sub-dialogue. The sub-dialogue annotations are obtained from a human annotator. The one or more sub-dialogue annotations include an annotation as to whether the sub-dialogue is constructive. The software extracts a plurality of features from each sub-dialogue and uses them and the sub-dialogue annotations associated with the sub-dialogue to train a classifier that determines whether a particular sub-dialogue is constructive. Then the software obtains a new sub-dialogue from a thread currently displayed in the online forum and extracts the plurality of features from the new sub-dialogue. The software inputs the features extracted from the new sub-dialogue into the classifier and obtains a determination as to whether the new sub-dialogue is constructive. Each sub-dialogue is sequentially modeled using conditional random fields. Then the software uses the determination to re-locate the new sub-dialogue in the thread.

BRIEF DESCRIPTION OF THE DRAWINGS

FIG. 5 shows a table listing specified sub-dialogue annotations and specified comment annotations, in accordance with an example embodiment.

FIG. 7 shows a table listing precision scores for particular features, in accordance with an example embodiment.

DETAILED DESCRIPTION

Figure 1:
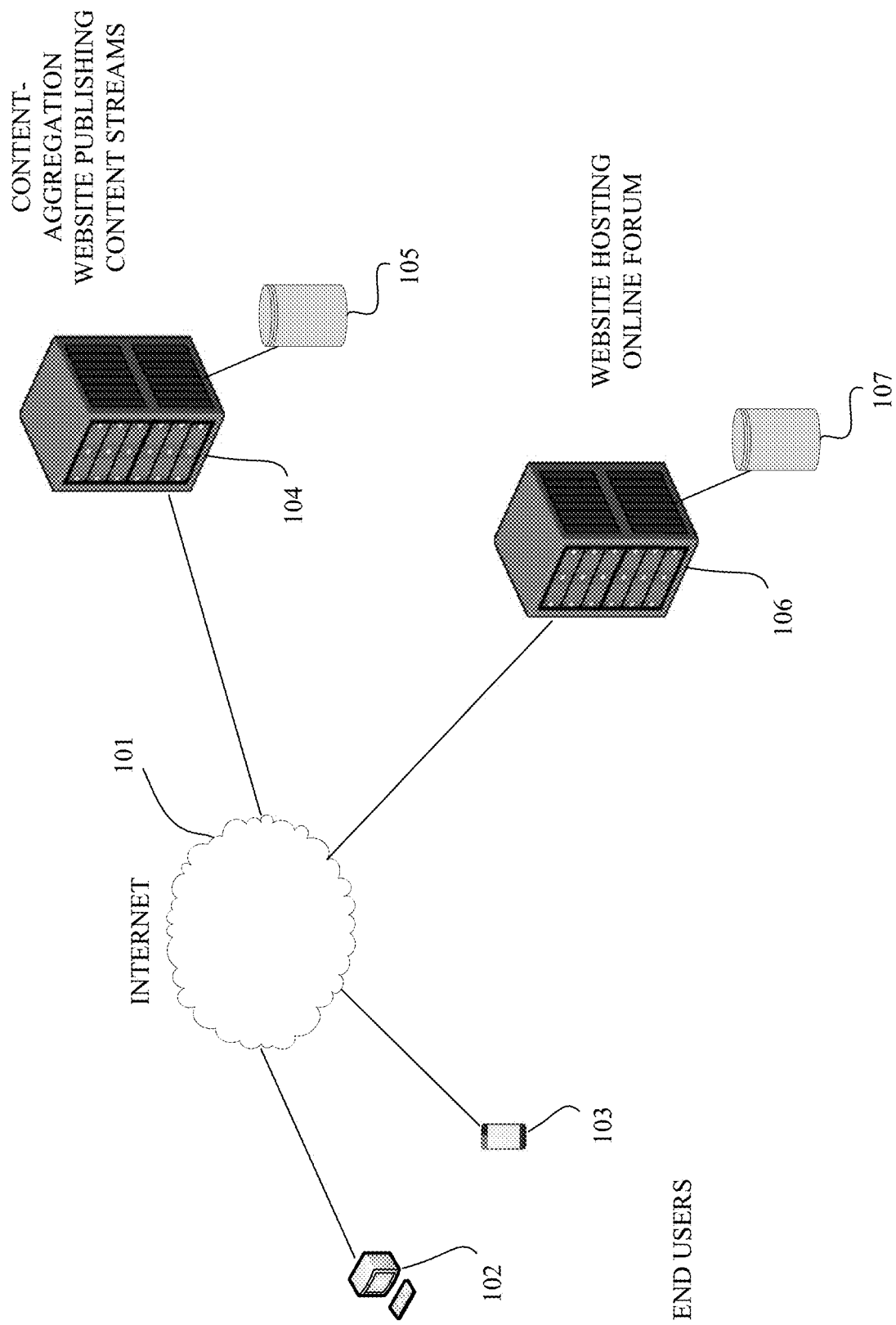
FIG. 1 is a network diagram showing a website hosting a content-aggregation service and a website hosting an online forum, in accordance with an example embodiment.

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used in this disclosure, the terms "constructive" and "non-constructive" have the following meanings.

Constructive: Constructive conversations do not require "conclusions." A conversation or argument does not have to have a winner or conclusion to be constructive, as long as there is a clear exchange of ideas, opinions, and information done somewhat respectfully. A constructive conversation should contain one or multiple points of agreement and/or disagreement, all mostly on topic, and be relatively respectful. Comments should contain new information (be informative) and/or attempt to persuade. Comments may also seek to contribute humor, sarcasm, or even meanness if in the context of a passionate attempt at persuasiveness. How much "meanness" degrades the constructiveness is subjective—some people are more tolerant than others of disrespectful language when heated arguments occur.

Non-constructive: Non-constructive conversations are those which are largely unproductive. Usually, the initial commenter's point does not get properly addressed (i.e., conversation does not contain a clear communicative goal; conversation is disconnected), is comprised of few attempts at persuasiveness, and each speech act can be taken in isolation. A sub-dialogue can also be deemed non-constructive if largely negative (i.e., an exchange of insults) or "all over the place" in terms of topic.

FIG. 1 is a network diagram showing a website hosting a content-aggregation service and a website hosting an online forum, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting a content-aggregation service that publishes articles with comment sections and a website 106 hosting an online forum (e.g., reddit). Websites hosting a content-aggregation service, including websites hosting a social-networking service, often display content to a user using graphical user interface (GUI) functionality called a "content stream". Such websites determine inclusion or prominence of an item (e.g., an article) in the content stream based at least in part on a personalized user-interest profile which records the user's explicit and implicit relevance feedback as to previous items of content presented in the content stream. Explicit relevance feedback might take the form of user input to a GUI dialog inquiring about the user's interests. Implicit relevance feedback might include the viewing/listening history of the user, e.g., click-throughs and/or other measures of time spent (e.g., time spent viewing, time spent listening, time spent playing, etc.) by the user on categorized content. In an example embodiment, website 104 might be a website such as Yahoo! News or Google News, which ingests content from the Internet through "push" technology (e.g., a subscription to a web feed such as an RSS feed) and/or "pull" technology (e.g., web crawling), including articles (or Uniform Resource Locators (URLs) for articles).

Alternatively, in an example embodiment, website 104 might host an online social network such as Facebook or Twitter. As used here and elsewhere in this disclosure, the term "online social network" is to be broadly interpreted to include, for example, any online service, including a social-media service, that allows its users to, among other things: (a) selectively access (e.g., according to a friend list, contact list, buddy list, social graph, interest graph, or other control list) content (e.g., text including articles and web links, images, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including articles and/or comments, web links, images, videos, animations, audio recordings, games and other software, etc.) to each other's newsfeeds (e.g., content/activity streams such as Facebook's News Feed, Twitter's Timeline, Google Plus's Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

And as used in this disclosure, the term "content-aggregation service" is to be broadly interpreted to include any online service, including a social-media service, that allows its users to, among other things, access and/or annotate (e.g., comment on) content (e.g., text including articles and/or comments, web links, images, videos, animations, audio recordings, games and other software, etc.) aggregated/ingested by the online service (e.g., using its own curators and/or its own algorithms) and/or posted by its users and presented in a "wall" view or "stream" view. It will be appreciated that a website hosting a content-aggregation service might have social features based on a friend list, contact list, buddy list, social graph, interest graph, distribution list, or other control list that is accessed over the network from a separate website hosting an online social network through an application programming interface (API) exposed by the separate website. Thus, for example, Yahoo! News might identify the content items (e.g., articles) in its newsfeed (e.g., as displayed on the front page of Yahoo! News) that have been viewed/read by a user's friends, as listed on a Facebook friend list that the user has authorized Yahoo! News to access.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Hadoop YARN, Pig, Hive, Dremel, CloudBase, etc. The servers in website 104 might be connected to persistent storage 105 and the servers in website 106 might be connected to persistent storage 107. Persistent storages 105 and 107 might include flash memory, a redundant array of independent disks (RAID), and/or a storage area network (SAN), in an example embodiment. In an alternative example embodiment, the servers for websites 104 and 106 and/or the persistent storage in persistent storages 105 and 107 might be hosted wholly or partially in a public and/or private cloud, e.g., where the cloud resources serve as a platform-as-a-service (PaaS) or an infrastructure-as-a-service (IaaS).

Persistent storages 105 and 107 might be used to store content (e.g., text including articles and/or comments, web links, images, videos, animations, audio recordings, games and other software, etc.) and/or its related data. Additionally, persistent storage 105 might be used to store data related to users and their social contacts (e.g., Facebook friends), as well as software including algorithms and other processes, as described in detail below, for re-locating comments in a thread of comments on an article in a content stream. In an example embodiment, the content stream might be ordered from top to bottom (a) in reverse chronology (e.g., latest in time on top), or (b) according to interestingness scores, including the rankings discussed below. In an example embodiment, some of the content (and/or its related data) might be stored in persistent storages 105 and 107 and might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105 and 107.

Personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, and a global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104 and 106. Alternatively, users of personal computer 102 and/or mobile device 103 might use other application programs (or apps, including hybrid apps that display HTML content) to access content presented by websites 104 and 106.

Figure 2:
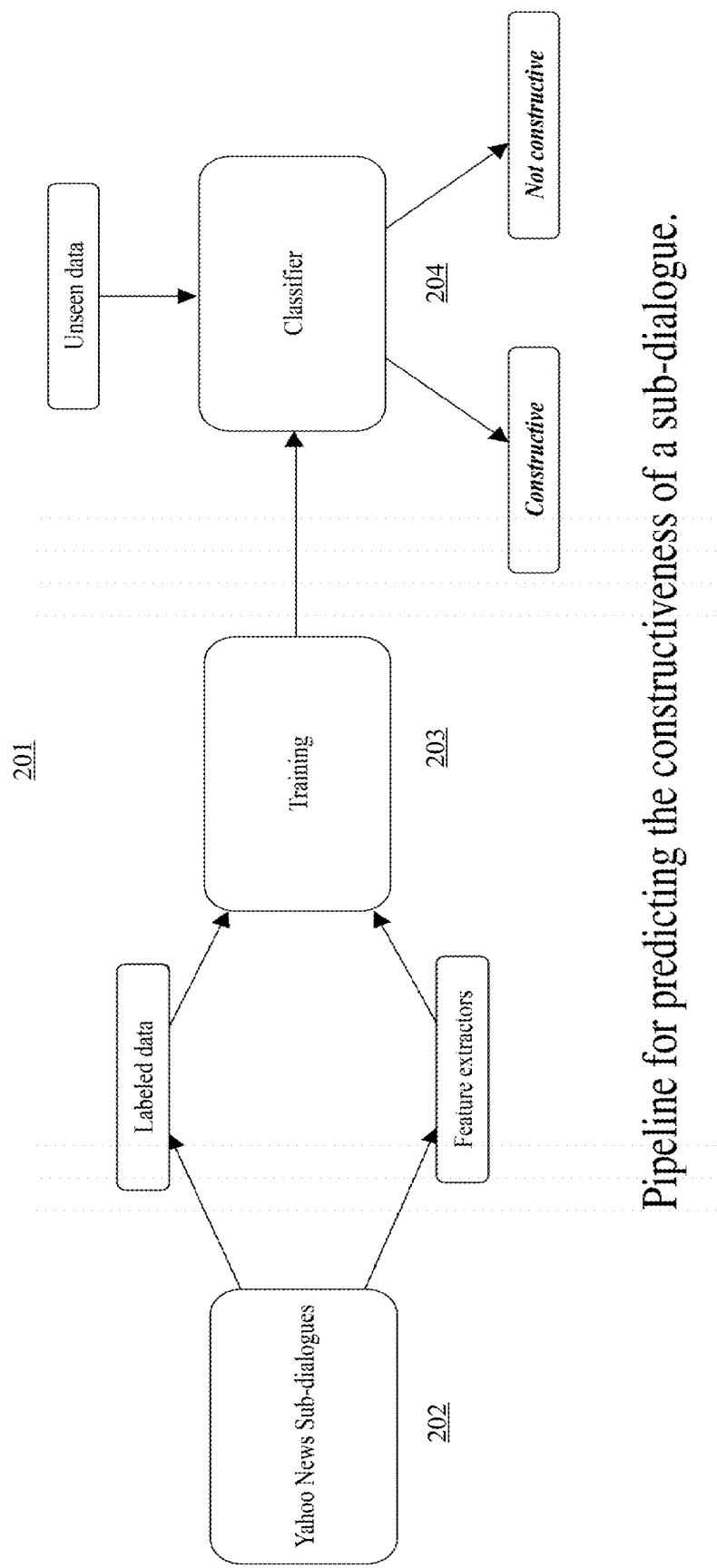
FIG. 2 is a diagram of a pipeline of software modules for determining the constructiveness of a sub-dialogue, in accordance with an example embodiment.

FIG. 2 is a diagram of a pipeline of software modules for determining the constructiveness of a sub-dialogue, in accordance with an example embodiment. As shown in this figure, pipeline 201 includes three software modules, identified as modules 202-204, which might run on the servers at website 104. In an example embodiment, module 202 extracts sub-dialogues from the comment section of articles displayed (e.g., in a content stream) on Yahoo! News. As used in this disclosure, a "sub-dialogue" consists of two or more comments in a thread of comments, e.g., in chronological order from the top (earliest) to the bottom (latest). Once extracted, the sub-dialogues are: (1) provided to human annotators who label the sub-dialogues as constructive or non-constructive and who annotate the sub-dialogues and comments, e.g., using the specified annotations shown in FIG. 5, as will be described in further detail below; (2) turned into representations (e.g., vectors) whose sequential values are specified features which will also be described in further detail below. The labeled and annotated sub-dialogues and their corresponding representations (e.g., vectors) might be used by module 203 to train binary classifier 204, which in an example embodiment might use logistic regression with L1 regularization, as described in Lee et al., "Efficient $L_1$ Regularized Logistic Regression" (American Association for Artificial Intelligence 2006), which is incorporated herein by reference. Then once trained, binary classifier 204 might be used to determine whether unseen sub-dialogues are constructive or not constructive, as shown in the figure.

Figure 3:
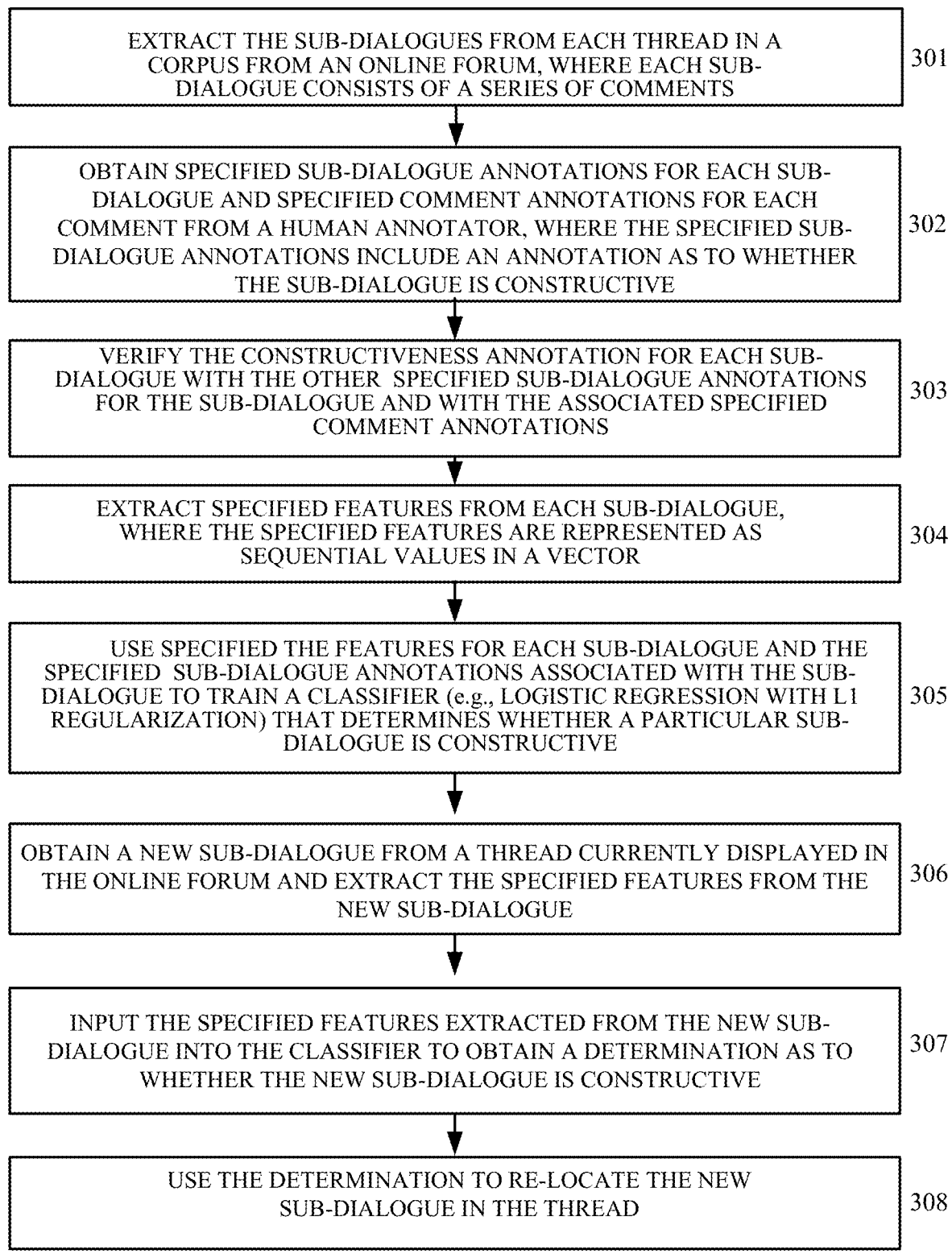
FIG. 3 is a flowchart diagram of a process for determining the constructiveness of a sub-dialogue, in accordance with an example embodiment.

FIG. 3 is a flowchart diagram of a process for determining the constructiveness of a sub-dialogue, in accordance with an example embodiment. In an example embodiment, the operations shown in this figure might be performed by software running on servers at website 104 (e.g., Yahoo! News, Google News, Facebook, Twitter, etc.) using persistent storage 105 or on servers at website 106 (e.g., an online forum such as reddit) using persistent storage 107. In an alternative example embodiment, some of the operations shown in this figure might be performed by software (e.g., a client application including, for example, a webpage with embedded JavaScript or ActionScript) running on a client device (e.g., personal computer 102 or mobile device 103). It will be appreciated that these operations provide specifics for the general operations depicted in FIG. 2.

As depicted in FIG. 3, software (e.g., software running on servers at website 104 or website 106) extracts the sub-dialogues from each thread in a corpus from an online forum (e.g., the comment section to articles on Yahoo! News), where each sub-dialogue consists of a series (e.g., two or more) of comments, in operation 301. In operation 302, the software obtains specified sub-dialogue annotations (e.g., the sub-dialogue annotations listed in FIG. 5) for each sub-dialogue and specified comment annotations (e.g., the comment annotations listed in FIG. 5) for each comment from a human annotator (e.g., a trained annotator or a worker from Amazon Mechanical Turk). The specified sub-dialogue annotations include an annotation as to whether the sub-dialogue is constructive. In an alternative example embodiment, the software might obtain only the constructiveness annotation from the human annotator (e.g., a trained annotator or a worker from Amazon Mechanical Turk). In operation 303, the software verifies the constructiveness annotation for each sub-dialogue, using the other sub-dialogue annotations for the sub-dialogue and the associated specified comment annotations. And in operation 304, the software extracts specified features from each sub-dialogue, where the specified features, as described in detail below, are represented as sequential values in a vector. In an alternative example embodiment, a sequential representation (e.g., a struct or record) other than a vector might be used for the specified features. In operation 305, the software uses the specified features for each sub-dialogue (e.g., constructiveness) and the specified sub-dialogue annotations associated with the sub-dialogue to train a binary classifier (e.g., logistic regression with l1 regularization) that determines whether a particular sub-dialogue is constructive. In an example embodiment, the software might also use the associated specified comment annotations for the sub-dialogue to train the binary classifier. In operation 306, the software obtains a new sub-dialogue from a thread currently displayed in the online forum (e.g., the comment section to articles on Yahoo! News) and extracts the specified features from the new sub-dialogue. The software inputs the specified features extracted from the new sub-dialogue into the trained binary classifier to obtain a determination as to whether the new sub-dialogue is constructive, in operation 307. Then in operation 308, the software uses the determination to re-locate the new sub-dialogue in the displayed thread. For example, if a sub-dialogue is determined to be constructive, it might be moved toward the top of a thread. If a sub-dialogue is determined to be non-constructive, it might be moved toward the bottom of a thread.

As noted above, in an example embodiment, the binary classifier might use logistic regression with L1 regularization. An off-the-shelf (OTS) version of such a binary classifier is included in scikit-learn. In an alternative example embodiment, the binary classifier might use convolutional neural networks. An off-the-shelf (OTS) version of such a binary classifier is included in TensorFlow.

As indicated above, sub-dialogues might be represented using features. In an example embodiment, features might be calculated for each comment and concatenated together to form a sub-dialogue, so that each comment has its own feature space and/or comment features are weighted equally. In the same or an alternative example embodiment, features might be calculated for a sub-dialogue "as a whole". When determining which comments to include in a sub-dialogue for purposes of concatenation or "as a whole", a window might be used. For example, a sub-dialogue with a window of 3 might include a particular comment and the comment prior (e.g., chronologically) to the particular comment and the comment following (e.g., chronologically) the particular comment. In an alternative example embodiment, other windows might be used, e.g., 5, 7, 9, etc. Also, in an example embodiment, every window size that is compatible with a particular thread, including the thread itself, might be used in a "brute force" approach.

In an example embodiment, the feature values for a sub-dialogue might be weighted, e.g., to reflect decay (or staleness). Also, in an example embodiment, a sub-dialogue might be sequentially modeled using conditional random fields (CRF) or recurrent neural networks.

Figure 4:
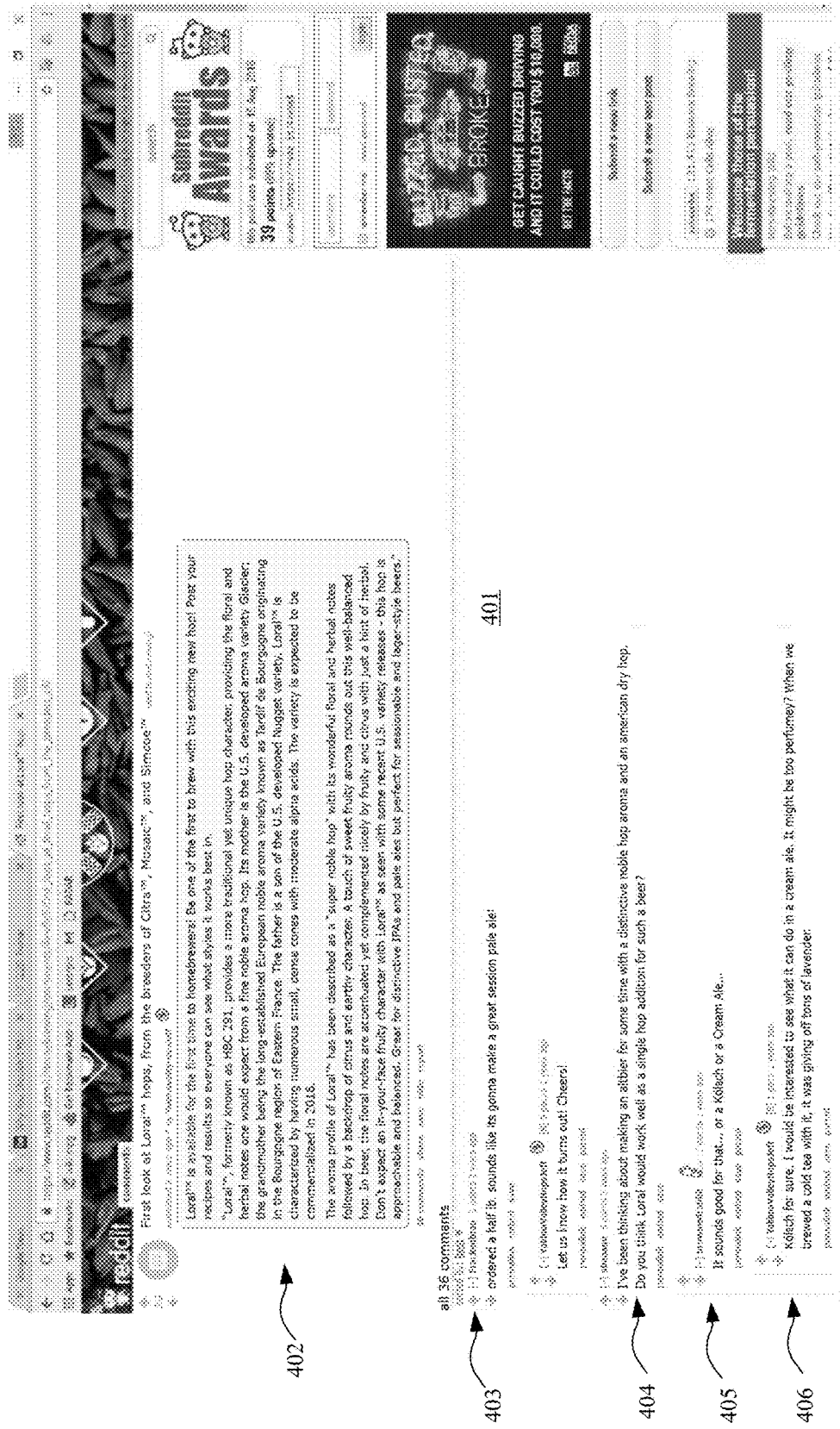
FIG. 4 shows the comments in a thread in an online forum, in accordance with an example embodiment.

FIG. 4 shows the comments in a thread in an online forum, in accordance with an example embodiment. In this example, the online forum is reddit, but other online forums and comment sections could be substituted here without loss of generality. As depicted in this figure, thread 401 was started by an initial post 402 describing "Loral hops". Following the initial post, 36 comments were posted, including comments 403-406. Comment 403 appears to be directed to the initial post 402 and describes the purchase of one half pound of Loral hops. But comment 404 poses a question as to whether Loral hops would work as a single hop addition for an altbier. And comments 405 and 406 respond positively to the question. In an example embodiment, software performing the operations described in FIG. 3 might determine that the sub-dialogue consisting of comments 404-406 is a constructive sub-dialogue and relocate those comments above comment 403.

FIG. 5 shows a table listing specified sub-dialogue annotations and specified comment annotations, in accordance with an example embodiment. In an example embodiment, these annotations might be added by human annotators (e.g., a trained annotator or a worker from Amazon Mechanical Turk) and used to train a binary classifier as described above with respect to FIGS. 2 and 3. It will be appreciated that the specified sub-dialogue annotations listed at the top of Table 1 in FIG. 5 include Constructiveness (whose enumerated values are "constructive" and "not constructive"), as well as groupings under Type and Agreement. In an alternative example embodiment, the sub-dialogue annotations might consist solely of Constructiveness. The specified comment annotations listed at the bottom of Table 1 in FIG. 5 include groupings under Sentiment, Tone, Agreement, Topic, Audience, and Persuasiveness, each of which is associated with two or more enumerated values. The specified comment annotation Persuasiveness can take an enumerated value of "persuasive" or "not persuasive"

Figure 6A:
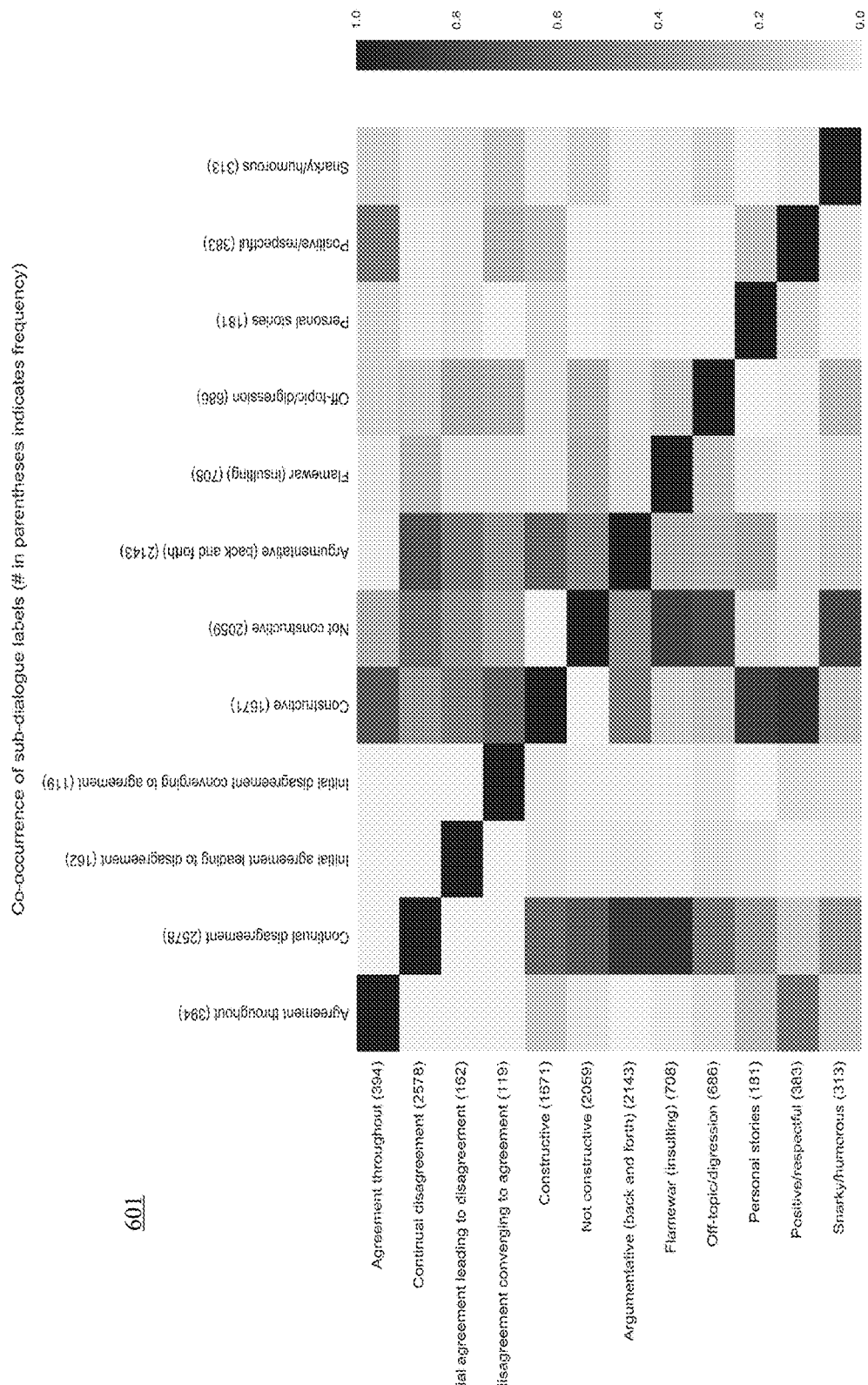
FIG. 6A shows a co-occurrence graph of sub-dialogue annotations with other sub-dialogue annotations, in accordance with an example embodiment.

FIG. 6A shows a co-occurrence graph of sub-dialogue annotations with other sub-dialogue annotations, in accordance with an example embodiment. In an example embodiment, co-occurrence graph 601 might be used to verify the sub-dialogue annotations, including the sub-dialogue annotation as to constructiveness, added by human annotators (e.g., a trained annotator or a worker from Amazon Mechanical Turk) and used to train a binary classifier as described above with respect to FIGS. 2 and 3. As shown by graph 601, "constructiveness" (on either the left or top axis) tends to co-occur with "agreement throughout", "initial disagreement converging to agreement", "personal stories", and "positive/respectful". And "not constructive" (on either the left or top axis) tends to co-occur with "flamewar (insulting)", "off-topic/digression", and "snarky/humorous".

Figure 6B:
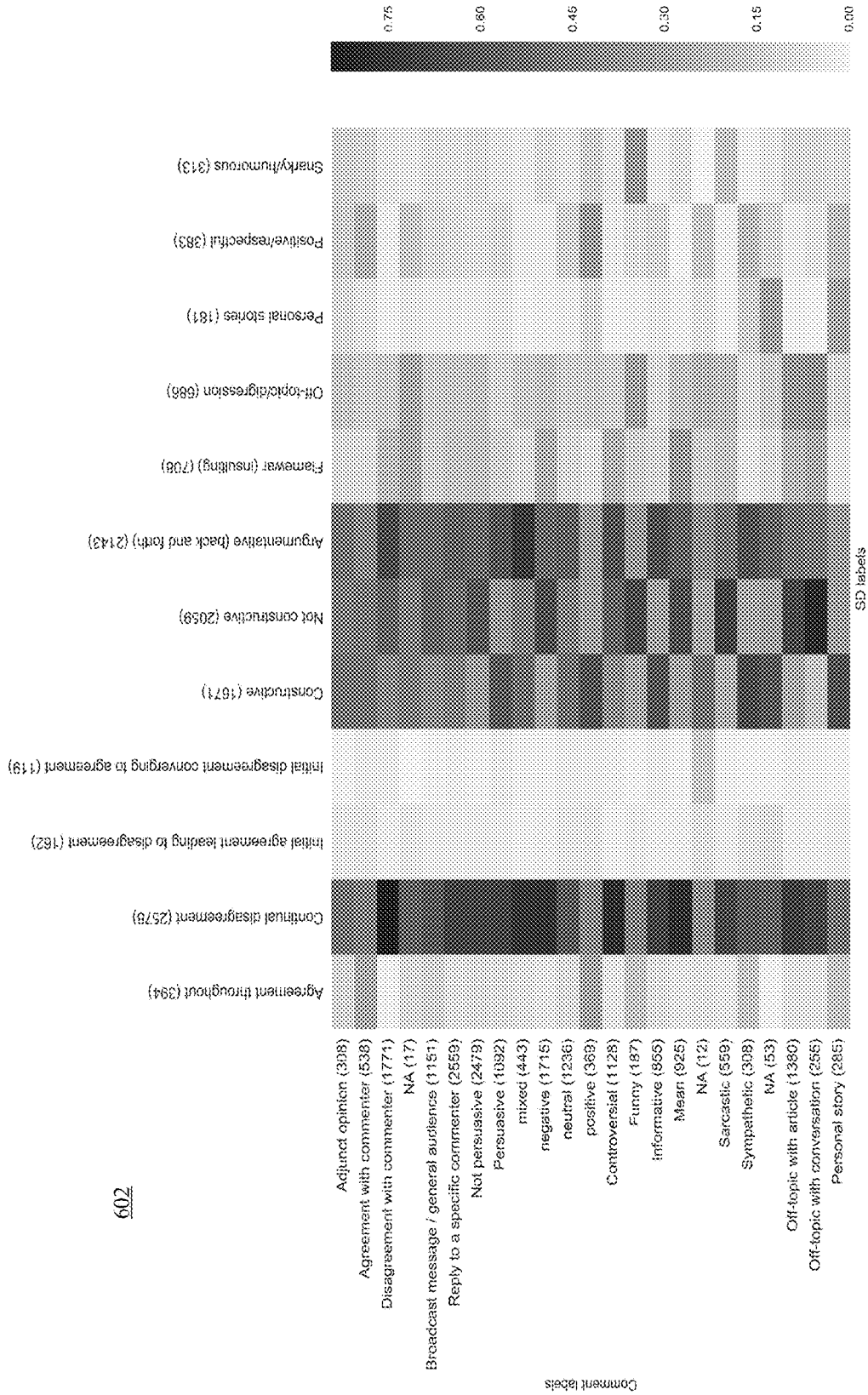
FIG. 6B shows a co-occurrence graph of sub-dialogue annotations with comment annotations, in accordance with an example embodiment.

FIG. 6B shows a co-occurrence graph of sub-dialogue annotations with comment annotations, in accordance with an example embodiment. In an example embodiment, co-occurrence graph 602 might be used to verify the sub-dialogue annotations, including the sub-dialogue annotation as to constructiveness, added by human annotators (e.g., a trained annotator or a worker from Amazon Mechanical Turk) and used to train a binary classifier as described above with respect to FIGS. 2 and 3. As shown by graph 602, the "constructiveness" (on the top axis) tends to co-occur with comment labels of "persuasive", "positive", "informative", and "sympathetic". And "not constructive" (on the top axis) tends to co-occur with comment labels of "not persuasive", "negative", "funny", "mean", "sarcastic", "off-topic with article", and "off-topic with conversation".

As noted earlier, sub-dialogues might be represented using features, which in turn might be represented using sequential values in a vector, struct, record, etc. In an example embodiment, the features used to represent sub-dialogues might include features from one or more of the following feature groups:

Case: Raw counts of: capitalized words, sentences without capitalization, sentences beginning with a lowercase letter, explanation points, question marks, ellipses, and contractions.

Comment: Features describing the length and popularity of a comment: the number of sentences and average token-length of sentences and character-length of tokens, the number of thumbs up, thumbs down, and thumbs up and down received.

Constituency: Max parse tree depth and normalized counts of parse constructions.

Dependency: Raw counts of dependency triples (lexicalized and backed-off to POS (Part-Of-Speech) tags).

Embeddings: Word embeddings from Word2Vec (see Tomas Mikolov, Ilya Sutskever, Kai Chen, Greg S Corrado, and Jeff Dean, Distributed representations of words and phrases and their compositionality (2013), in Advances in neural information processing systems, pages 3111-3119, which is incorporated herein by reference).

Entity: Counts of the named entities by type and average person name length.

Indices: Scores of the comments according to pre-existing style tools: the formality score (see Ellie Pavlick and Ani Nenkova, Inducing lexical style properties for paraphrase and genre differentiation (2015), in Proceedings of the 2015 Conference of the North American Chapter of the Association for Computational Linguistics: Human Language Technologies, pages 218-224, Denver, Colo., May-June, Association for Computational Linguistics, which is incorporated herein by reference); politeness score (see Cristian Danescu-Niculescu-Mizil, Moritz Sudhof, Dan Jurafsky, Jure Leskovec, and Christopher Potts, A computational approach to politeness with application to social factors (2013), in Proceedings of the 51st Annual Meeting of the Association for Computational Linguistics (Volume 1: Long Papers), pages 250-259, Sofia, Bulgaria, August, Association for Computational Linguistics, which is incorporated herein by reference); idea flow (see Vlad Niculae and Cristian Danescu-Niculescu-Mizil, Conversational markers of constructive discussions (2016), in Proceedings of the 2016 Conference of the North American Chapter of the Association for Computational Linguistics: Human Language Technologies, pages 568-578, San Diego, Calif., June, Association for Computational Linguistics, which is incorporated herein by reference); Flesch-Kincaid grade level (a readability measure)\; and SMOG index (another readability measure).

Influence: The total number of comments made and sub-dialogues participated in by the commenter over the course of two consecutive months; the total number of thumbs up, thumbs down, and both thumbs up and down received, and the percent of thumbs received; the total active time of the user during the period; and the activity rate (number of comments/time active).

Lexical: Token log frequency in the Web 1T corpus (see Thorsten Brants and Alex Franz (2009), Web 1T 5-gram, 10 European languages version 1, Linguistic Data Consortium, Philadelphia, which is incorporated herein by reference).

Lexicon features: Counts of phrases from different lexicons that appear in the comment. The lexicons are pronouns, expressions conveying certainty, hedges, comparisons, contingencies, expansions, hate words, and opinions. There are also binary features indicating if there are agreement or disagreement phrases in the comment.

N-gram: TF-IDF of token n-grams and normalized counts of part-of-speech n-grams (n=1; 2; 3).

Similarity: Comparison of the comment to the article headline, initial comment, preceding comment, and all previous comments measured by n-gram overlap and cosine similarity.

Subjectivity: Normalized count of hedge words, pronouns, and passive constructions; and the subjectivity and polarity scores estimated using TextBlob.

Temporal: Maximum, minimum, and mean difference between comments and the total elapsed time between the first and last comment.

Thread: Features describing the thread structure and popularity. Structure features are the number of comments, commenters, and the average number of comments per person. Popularity features are the counts of thumbs up and thumbs down in a thread as well the percent of thumbs up out of total number of thumbs up or down.

FIG. 7 shows a table listing precision scores for particular features, in accordance with an example embodiment. In an experiment, an L1-regularized logistic regression classifier was trained using feature groups in isolation. As indicated in Table 3 in FIG. 7, the following features gave high precision when determining constructiveness: the counts of named entities, the counts of thumbs up and thumbs down in a thread, the comment length, lower- and upper-case characteristics, and the formality score.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for performing a plurality of operations, comprising:
    extracting a plurality of sub-dialogues from a thread in a corpus from an online forum, wherein a sub-dialogue includes a plurality of comments and the thread includes at least one sub-dialogue;
    obtaining one or more sub-dialogue annotations associated with the sub-dialogue, wherein the one or more sub-dialogue annotations are associated with an annotation as to whether the sub-dialogue is constructive based upon one or more features of a first comment of the sub-dialogue and one or more features of a second comment of the sub-dialogue;
    extracting a plurality of features from the sub-dialogue, the plurality of features comprising a first set of sub-dialogue features and a second set of sub-dialogue features represented using a vector of values, wherein the extracting the plurality of features comprises:
        determining comment features comprising a first comment feature associated with the first comment and a second comment feature associated with the second comment;
        weighting the comment features to generate weighted comment features;
        generating the first set of sub-dialogue features based upon the weighted comment features; and
        generating the second set of sub-dialogue features based upon a window of chronologically ordered comments;
    using the vector representing the plurality of features from the sub-dialogue and at least one sub-dialogue annotation associated with the sub-dialogue to train a classifier that determines whether a particular sub-dialogue is constructive;
    obtaining a new sub-dialogue from a thread currently displayed in the online forum and extracting one or more features from the new sub-dialogue, the one or more features from the new sub-dialogue represented as a new vector;
    inputting the new vector representing the one or more features extracted from the new sub-dialogue into the classifier and obtaining a determination as to whether the new sub-dialogue is constructive, wherein the determination is performed using values of the one or more features of the new sub-dialogue included in the new vector; and
    re-locating the new sub-dialogue in the thread based upon the determination, wherein each operation of the plurality of operations is performed by one or more processors.

2. The method of claim 1, the re-locating comprising:
    re-locating the new sub-dialogue from a current location in the thread to a first location in the thread responsive to determining that the new sub-dialogue is constructive, the first location above the current location; or
    re-locating the new sub-dialogue from the current location in the thread to a second location in the thread responsive to determining that the new sub-dialogue is non-constructive, the second location below the current location.

3. The method of claim 1, comprising determining that the new sub-dialogue is constructive based upon a determination that the new sub-dialogue at least one of:
    comprises one or more points of agreement between two or more comments included in the new sub-dialogue;
    comprises one or more points of disagreement between the two or more comments included in the new sub-dialogue; or
    is on topic across the two or more comments included in the new sub-dialogue.

4. The method of claim 1, comprising determining that the new sub-dialogue is non-constructive based upon a determination that the new sub-dialogue at least one of:
    comprises a disconnect between two or more comments included in the new sub-dialogue;
    comprises a lack of a communicative goal between the two or more comments included in the new sub-dialogue; or
    is off topic across the two or more comments included in the new sub-dialogue.

5. The method of claim 1, comprising determining that the new sub-dialogue is constructive based upon a determination that the new sub-dialogue comprises one or more points of agreement between two or more comments included in the new sub-dialogue.

6. The method of claim 1, comprising determining that the new sub-dialogue is constructive based upon a determination that the new sub-dialogue comprises one or more points of disagreement between two or more comments included in the new sub-dialogue.

7. The method of claim 1, comprising determining that the new sub-dialogue is constructive based upon a determination that the new sub-dialogue is on topic across two or more comments included in the new sub-dialogue.

8. The method of claim 1, comprising determining that the new sub-dialogue is non-constructive based upon a determination that the new sub-dialogue comprises a disconnect between two or more comments included in the new sub-dialogue.

9. The method of claim 1, comprising determining that the new sub-dialogue is non-constructive based upon a determination that the new sub-dialogue comprises a lack of a communicative goal between two or more comments included in the new sub-dialogue.

10. One or more non-transitory computer-readable media persistently storing a program, wherein the program, when executed, instructs a processor to perform operations comprising:
    extract a plurality of sub-dialogues from a thread in a corpus from an online forum, wherein a sub-dialogue includes a plurality of comments and the thread includes at least one sub-dialogue;
    obtain one or more sub-dialogue annotations associated with the sub-dialogue, wherein the one or more sub-dialogue annotations are associated with an annotation as to whether the sub-dialogue is constructive based upon one or more features of a first comment of the sub-dialogue and one or more features of a second comment of the sub-dialogue;
    extract a plurality of features from the sub-dialogue, the plurality of features comprising a first set of sub-dialogue features and a second set of sub-dialogue features represented using a vector of values, wherein the extracting the plurality of features comprises:
  determining comment features comprising a first comment feature associated with the first comment and a second comment feature associated with the second comment;
  weighting the comment features to generate weighted comment features;
  generating the first set of sub-dialogue features based upon the weighted comment features; and
  generating the second set of sub-dialogue features based upon a window of chronologically ordered comments;
use the vector representing the plurality of features from the sub-dialogue and at least one sub-dialogue annotation associated with the sub-dialogue to train a classifier that determines whether a particular sub-dialogue is constructive;
obtain a new sub-dialogue from a thread currently displayed in the online forum and extract one or more features from the new sub-dialogue, the one or more features from the new sub-dialogue represented as a new vector;
input the new vector representing the one or more features extracted from the new sub-dialogue into the classifier and obtain a determination as to whether the new sub-dialogue is constructive, wherein the determination is performed using values of the one or more features of the new sub-dialogue included in the new vector; and
re-locate the new sub-dialogue in the thread based upon the determination.

11. The non-transitory computer-readable media of claim 10, wherein the one or more sub-dialogue annotations are obtained from a human annotator.

12. The non-transitory computer-readable media of claim 10, wherein the classifier uses logistic regression with L1 regularization.

13. The non-transitory computer-readable media of claim 10, wherein the classifier uses convolutional neural networks.

14. The non-transitory computer-readable media of claim 10, wherein the plurality of features are represented as sequential values in a vector.

15. The non-transitory computer-readable media of claim 10, wherein the first set of sub-dialogue features are different than the second set of sub-dialogue features.

16. The non-transitory computer-readable media of claim 10, wherein the sub-dialogue is sequentially modeled using conditional random fields.

17. The non-transitory computer-readable media of claim 16, wherein the window is a window of three sequential comments.

18. The non-transitory computer-readable media of claim 10, wherein the plurality of features include a measure of similarity to preceding comments in the sub-dialogue.

19. A method for performing a plurality of operations, comprising:
  extracting a plurality of sub-dialogues from a thread in a corpus from an online forum, wherein a sub-dialogue includes a plurality of comments and the thread includes at least one sub-dialogue;
  obtaining one or more sub-dialogue annotations associated with the sub-dialogue, wherein the one or more sub-dialogue annotations are associated with an annotation as to whether the sub-dialogue is constructive based upon one or more features of a first comment of the sub-dialogue and one or more features of a second comment of the sub-dialogue, wherein the one or more sub-dialogue annotations are received from an annotator;
  extracting a plurality of features from the sub-dialogue, the plurality of features comprising a first set of sub-dialogue features and a second set of sub-dialogue features represented using a vector of values, wherein the extracting the plurality of features comprises:
    determining comment features comprising a first comment feature associated with the first comment and a second comment feature associated with the second comment;
    weighting the comment features to generate weighted comment features;
    generating the first set of sub-dialogue features based upon the weighted comment features; and
    generating the second set of sub-dialogue features based upon a window of chronologically ordered comments;
  using the vector representing the plurality of features from the sub-dialogue and at least one sub-dialogue annotation associated with the sub-dialogue to train a classifier that determines whether a particular sub-dialogue is constructive;
  obtaining a new sub-dialogue from a thread currently displayed in the online forum and extracting one or more features from the new sub-dialogue, the one or more features from the new sub-dialogue represented as a new vector;
  inputting the new vector representing the one or more features extracted from the new sub-dialogue into the classifier and obtaining a determination as to whether the new sub-dialogue is constructive, wherein the sub-dialogue is sequentially modeled using conditional random fields and wherein the determination is performed using the values of the one or more features of the new sub-dialogue included in the new vector; and
  re-locating the new sub-dialogue in the thread based upon the determination, wherein each operation of the plurality of operations is performed by one or more processors.

20. The method of claim 19, wherein the classifier uses at least one of logistic regression with L1 regularization or convolutional neural networks.

* * * * *